United States Patent [19]
Smith

[11] Patent Number: 6,086,995
[45] Date of Patent: Jul. 11, 2000

[54] SELF-WOUND SELF-ADHESIVE SURFACE COVERING MATERIAL

[75] Inventor: John Ralph Smith, Gansevoort, N.Y.

[73] Assignee: Decora North America, North Ridgeville, Ohio

[21] Appl. No.: 08/242,297

[22] Filed: May 13, 1994

[51] Int. Cl.[7] ................................................. C09J 7/02
[52] U.S. Cl. .......................... 428/352; 428/354; 428/906
[58] Field of Search .................... 428/354, 40, 352, 428/355, 480, 906

[56] References Cited

U.S. PATENT DOCUMENTS

| | | | |
|---|---|---|---|
| Re. 32,929 | 5/1989 | Ewing | 428/220 |
| 2,432,376 | 12/1947 | Brady . | |
| 3,796,678 | 3/1974 | Bartizal . | |
| 3,905,929 | 9/1975 | Noll . | |
| 3,988,278 | 10/1976 | Bartizal . | |
| 4,151,319 | 4/1979 | Sackoff et al. | 428/40 |
| 4,346,189 | 8/1982 | Laurent | 524/267 |
| 5,043,381 | 8/1991 | Coogan et al. | 524/591 |

FOREIGN PATENT DOCUMENTS 1157040  7/1969  United Kingdom .

*Primary Examiner*—Jenna Davis
*Attorney, Agent, or Firm*—Hedman, Gibson & Costigan, P.C.

[57] ABSTRACT

An improved self-wound roll of a pressure sensitive adhesive coated laminate comprising a substrate which becomes dimensionally-unstable under normal processing conditions, e.g., printing, at least one layer comprising a continuous film of a normally dimensionally stable polymer adhesively fixed to one or both sides of the substrate thereby stabilizing it during processing, a transparent flexible release layer of a resin on the outwardly facing surface of the laminate, and a layer of a modified pressure sensitive adhesive on the inwardly facing surface of the substrate. The laminate can be processed without distortion, wound into rolls, unwound and applied to a surface to be decorated without delamination or shrinkage and without distortion of printed indicia, and it ultimately can be stripped without damage to the surface.

7 Claims, 4 Drawing Sheets

SELF-WOUND SELF-ADHESIVE SURFACE COVERING MATERIAL

BACKGROUND OF THE INVENTION

1. Field of the Invention

This invention pertains to the field of self-wound covering materials using a laminate with improved dimensional stability. More particularly, this invention relates to improved decorative or protective laminates comprising a substrate which under normal processing conditions, i.e., printing of indicia, becomes dimensionally unstable, wherein the dimensional stability is improved by incorporating a stabilizing layer or layers of polymer films to reduce or eliminate shrinkage, edge curl and distortion of printed indicia after application to a substrate, e.g., walls or shelves, for decorative and/or protective purposes.

2. Description of the Prior Art

Self-wound and non-self-wound covering materials are used in a great variety of areas, such as, for tapes, decals, decorative and protective coverings in sheet form for walls, furniture, and the like, self-stick floor coverings, and generally, for any purpose wherein it is desired to adhere an article to a substrate. Self-winding is more desirable in that it eliminates the need to strip and discard a protective release layer as part of the application process.

Commonly-owned U.S. Pat. No. 4,151,319, Sackoff et al., granted Apr. 24, 1979, discloses methods of making both strippable non-self-wound and self-wound pressure sensitive adhesive coated laminates. The methods involve application of a modified pressure sensitive adhesive layer containing means for decreasing the zero-minute peel value of the facing layer-pressure sensitive adhesive layer of the laminate. This is accomplished by mixing a specifically selected polysiloxane into the pressure sensitive adhesive and such a modification of the pressure sensitive adhesive yields products which may be repositioned during application without tearing, stretching or otherwise causing damage. Special mention is made of the specific teaching in Sackoff et al. at Col. 6, lines 48–54, in which a self-wound construction having a release coated outer facing layer is used with the modified pressure sensitive adhesive. Also of special interest in this connection is the disclosure in commonly-owned pending application of Smith, U.S. Ser. No. 08/043,388, filed Apr. 6, 1993. Smith discloses an improved modified pressure sensitive adhesive for use in the laminates of the type described by Sackoff et al. Smith employs a mixture of specific silicones as a zero peel strength modifying means and their use in self-wound self-adhesive laminates wherein the outer surface of a facing layer possesses improved release properties.

Sackoff et al. and Smith disclose that a desirable feature of a preferred embodiment of their invention is to produce a so-called self-wound surface covering, i.e., one which does not use or require a protective temporary release sheet which must be removed and discarded as part of the application process. However, each specifically state (e.g. Sackoff et al., Col. 4, lines 55–60) that such embodiments are uniquely useful for narrow tapes, thus teaching away from the use of self wound rolls in widths suitable for covering walls, shelves and the like with rolls wider than for example those used in tapes or borders. While the reasons for such preferences are not clearly understood at this time, it is believed that unwinding larger rolls made in accordance with the mentioned prior art will cause delamination and damage to the outer surface because of failure to release along the longer contact lines.

Although the surface coverings provided by Sackoff et al. and by Smith's teachings have enjoyed wide commercial acceptance, especially in the case of using strippable layers for protecting the adhesive prior to application, the self-wound embodiments have several shortcomings. If, for example, a vinyl substrate is used, normal processing operations, such as in-line printing or adhesive coating, can cause distortions in the substrate. These can lead to dimensional stretching, which is unrelieved during winding, and usually is not noticed until after application. Such distortions tend to relieve themselves after application whereupon any printed indicia can be distorted itself, and edge lifting or edge curl might be seen. Adhesives with high peel strength values have been utilized to reduce these affects, however using these adhesives will make the surface coverings difficult to remove in the long run resulting in damage to the substrate, e.g., painted wall board, upon removal.

It has now been discovered that providing such laminates which further incorporate one or more polymeric layers selected to remain dimensionally stable under normal processing conditions overcomes all of the drawbacks of the self-wound surface coverings of the prior art. Specifically, the dimensionally stable surface covering will not exhibit the defects of the prior art upon application. Also, the surface coverings of the current invention show improved stain resistance and can be removed after years of service without damaging the substrate since there is no need to use an adhesive with excessively high peel strength values.

SUMMARY OF THE INVENTION

In accordance with the present invention there are provided self-wound self-adhesive rolls for application to a surface, the surface covering comprising, (i) a substrate having an optionally decorated outwardly facing surface and an inwardly facing surface, the substrate comprising a continuous film of a polymer which under normal processing conditions becomes dimensionally-unstable; (ii) an optionally decorated optional layer comprising a continuous film of a polymer which under normal processing conditions remains dimensionally stable, the film being adhesively fixed to the outwardly facing surface of the substrate thereby stabilizing the substrate for processing; (iii) a transparent flexible layer of a synthetic resin material having release properties on the outwardly facing surface of the substrate (i) or on the optionally decorated optional layer (ii); (iv) an optional layer comprising a continuous film of a polymer which under normal processing conditions remains dimensionally stable, the film being adhesively fixed to the inwardly facing surface of the substrate thereby stabilizing the substrate for processing; and (v) a layer of a pressure sensitive adhesive on the inwardly facing surface of the substrate layer or on layer (iv), with the proviso that at least one of optional layers (ii) or (iv) must always be present, and wherein the roll includes a plurality of turns of the decorative covering, the transparent, flexible release layer (iii) on one turn contacting the pressure-sensitive adhesive layer (v) on an adjacent turn, and the release layer (iii) on the one turn being readily separable from the pressure-sensitive adhesive layer (v) on the adjacent turn, whereby the roll may be unrolled without delamination of the decorative covering.

Also contemplated by the invention are preferred configurations of the surface coverings which consist essentially of elements (i), (ii), (iii), and (v), elements (i), (iii), (iv), and (v) or elements (i), (ii), (iii), (iv) and (v). Also preferred coverings wherein the substrate comprises a vinyl- or vinylidene halide homopolymer or copolymer, the optional layers (ii) and (iv) comprise a polyolefin or a polyester; the release layer (iii) has a matte or gloss finish and comprises a synthetic polymer or copolymer having a minimum film-forming temperature below about 20° C.; the pressure sensitive adhesive (v) comprises the residue obtained by drying an emulsion of natural and synthetic rubbers, polyisobutylene, polyvinyl alkyl ethers, vinyl acetate copolymers, acrylic ester polymers or acrylic ester copolymers; and modified with a means for decreasing the "zero minute peel value" comprises either a polysiloxane formed from monomeric units having structures (I) and (II) as follows:

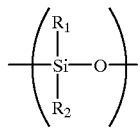

(I)

and

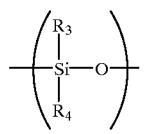

(II)

wherein $R_1$ is (i) phenyl, (ii) methyl, (iii) tolyl, or

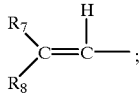

(iv)

wherein $R_7$ and $R_8$ may be the same or different and may be hydrogen, methyl, or ethyl, and wherein when $R_1$ is (i), (ii), (iii) or the group (iv), the prime mole percent of structure (I) is form about 0.5 to 50 and the prime mole percent of structure (II) is from about 99.5 to 50; and a polyoxyalkylene group having the structural formula

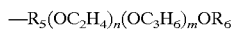

—$R_5(OC_2H_4)_n(OC_3H_6)_mOR_6$ wherein $R_6$ is hydrogen or a monovalent hydrocarbon group having from 1 to 10 carbon atoms and contains both oxyethylene and oxypropylene units, $R_5$ is an alkylene group having at least two carbon atoms, n and m are numbers, the sum of n and m is at least 1 and the oxyalkylene unit $R_6(OC_3H_6)_m(OC_2H_4)_n$, has a molecular weight of at least about 80, and wherein there are at least two units having structure (I) and at least three units having structure (II) and wherein the oxyalkylene unit constitutes from about 85 to 30 weight percent of the polysiloxane polymer; $R_2$ is methyl, ethyl or phenyl; $R_3$ and $R_4$ are the same or different and are methyl or ethyl or an admixture of polysiloxanes (A) and (B) in intimate combination with the pressure sensitive adhesive, the polysiloxane (A) being substantially water-insoluble and insoluble in said pressure sensitive adhesive and formed from monomeric units having structures (Ia) and (IIa) as follows:

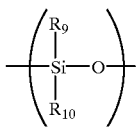

(Ia)

and

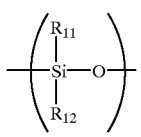

(IIa)

wherein $R_9$ is methyl, ethyl, phenyl, tolyl, or a mixture of any of them, $R_{10}$ is methyl, ethyl or phenyl; and $R_{11}$ and $R_{12}$ are the same or different and are methyl or ethyl, wherein the majority of units (Ia) and (IIa) comprise units (IIa), and the polysiloxane (A) has a viscosity in the range of from 5 cps to 60,000 cps measured at 25° C. with a #4 spindle at 30 rpm; and the polysiloxane (B) being water-soluble and compatible with polysiloxane (A) and formed from monomeric units having structures (Ib) and (IIb) as follows:

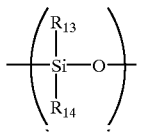

(Ib)

and

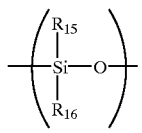

(IIb)

wherein $R_{13}$ is a polyoxyalkylene group having the structural formula

—$R_{17}(OC_2H_4)_q(OC_3H_6)_pOR_8$ wherein $R_{18}$ is hydrogen or a monovalent hydrocarbon group having from 1 to 10 carbon atoms and contains both oxyethylene and oxypropylene units, $R_{17}$ is an alkylene group having at least two carbon atoms, q and p are numbers, the sum of q and p is at least 1 and the oxyalkylene unit $R_{18}(OC_3H_6)_p(OC_2H_4)_q$, has a molecular weight of at least about 80, and wherein there are at least two units having structure (Ib) and at least three units having structure (IIb) and wherein the oxyalkylene unit constitutes from about 85 to 30 weight percent of the polysiloxane polymer; $R_{14}$ may be methyl, ethyl or phenyl; and $R_{15}$ and $R_{16}$ may be the same or different and be methyl or ethyl, and said polysiloxane (B) has a viscosity in the range of from 50 to 5000 cps measured at 25° C. with a #4 spindle at 30 rpm, the amount of polysiloxane (A) in the admixture being effective to separate from the adhesive and to bloom to the adhesive/air interface of the laminate coated with the adhesive composition to provide efficient repositionability and the amount of polysiloxane (B) in the admixture being effective to provide faster wet-out of the adhesive to a bonding substrate and ultimately, superior adhesion thereto.

Special mention is made of more preferred features comprising surface covers wherein the substrate (i) comprises a poly(vinyl chloride) homopolymer; those wherein optional layers (ii) and (iv) are polypropylene or poly(ethylene terephthalate), those in which release layer (iii) comprises the residue obtained by drying a composition comprising (a) an emulsion of copolymers of vinylidene chloride and one or more acrylic esters, copolymers of styrene and one or more acrylic esters, plasticized polyvinyl acetate, vinyl acetate copolymers, acrylic ester polymers, acrylic ester copolymers, copolymers of styrene and butadiene, copolymers of styrene and acrylonitrile, copolymers of styrene and methyl methacrylate, an emulsion or a solution of a resin comprising a polyester or a polyurethane, mixtures of any of the foregoing, and the like, (b) a small, effective amount of a release agent comprising a silicone, a natural wax, a synthetic wax, or a mixture of any of the foregoing, and (c) where a matte surface is desired, an effective amount of a flatting agent such as calcium silicate, barium sulfate, natural and synthetic silicas or other compounds known in the art, preferably a synthetic silica in an amount of about 10% to about 20% by weight, to reduce the gloss to a desired level, and even more preferably those in which release layer (iii) comprises a polyurethane or polyester cast- or transfer-coated from an aqueous medium; and those wherein the preferred means for decreasing the "zero minute peel value" comprises a polysiloxane or alternatively admixed polysiloxanes (A) and (B), preferably those wherein the amount of polysiloxane or admixed polysiloxanes (A) and (B) present is in the range from about 0.001 to 20 percent based on the solids content of the pressure sensitive adhesive.

DETAILED DESCRIPTION OF THE INVENTION

Figure 1:
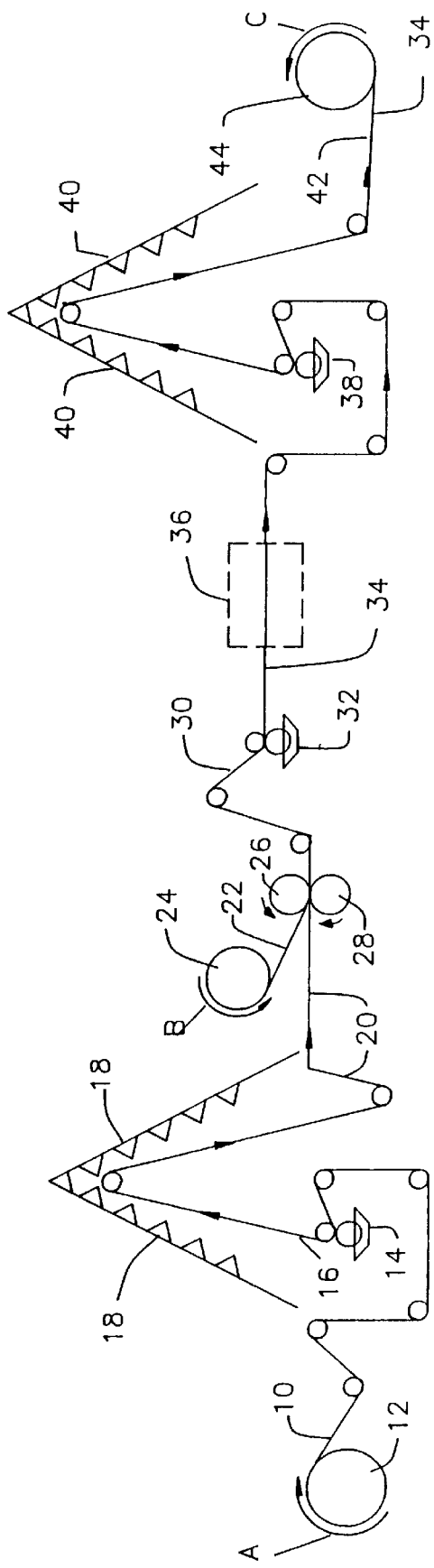
FIG. 1 is a schematic diagram of an apparatus to produce a self-wound self-adhesive surface covering material in accordance with a preferred embodiment of the present invention.

Referring to the drawings, FIG. 1 shows a method for forming a laminate in accordance with the present invention (FIG. 4) comprising first adhesively coating the inner surface of polymeric film layer 10, which under normal processing conditions remains dimensionally stable and which will be more fully described hereinafter, from roll 12, which turns in the direction indicated by arrow A, by passing through pan 14. The adhesive in pan 14 can comprise, for example, an emulsion of natural and synthetic rubbers, polyisobutylene, polyvinyl alkyl ethers, vinyl acetate copolymers, acrylic ester polymers or acrylic ester copolymers, or the like.

Thereafter, polymeric film layer 10 having inner side adhesive coated layer 16 is passed through drying or curing zone 18 which utilizes a conventional curing means, such as, heat, radiation, electron beams, etc., to appropriately cure or set the inner surface of polymeric film layer 10 so as to produce pressure sensitive adhesive coating 20 on the polymeric film layer.

The thus coated and cured sheet is married to substrate 22, in which the substrate suitably will be a vinyl- or vinylidene halide homopolymer or copolymer, or preferably a poly (vinyl chloride) homopolymer, and preferably a plastisol thereof, unrolled from roll 24, which turns in the direction indicated by arrow B. The two layers are married by passing through nip rollers 26 and 28 in a manner well known in the art, forming a dimensionally stabilized laminate 30. The pressure of nip rollers 26 and 28 generally ranges from about 20–80 psi.

Following the marrying step, outer layer 10 of the dimensionally stabilized laminate, is coated with a release material in pan 32, the release material comprising a synthetic polymer or copolymer having a minimum film-forming temperature below about 20° C. and which will be more fully described hereinafter, to form outer release layer 34 cast-coated on dimensionally stabilized laminate 30 so as to produce a release coated dimensionally stabilized laminate which then is passed through second drying or curing zone 36 which utilizes a conventional curing means, such as, heat, radiation, electron beams, etc., to appropriately cure or set outer release layer 34 of the laminate. This produces a cured outer release surface on said dimensionally stabilized laminate.

The inner surface of substrate 22 is next coated with a pressure sensitive adhesive by passing through pan 38. Preferably, the pressure sensitive adhesive is modified by incorporation of a polysiloxane, formed from monomeric units having structures (I) and (II), or an admixture of polysiloxanes (A) and (B) into the adhesive in a manner which will be described in greater detail hereinafter.

Of course, although roller coating from a pan or press is shown, various methods are known to the art for applying pressure sensitive adhesives and any of these conventional methods can be used to apply the pressure sensitive adhesive of the present invention. Typical methods include, for example, knife-coating, spraying, bar coating, gravure roll coating, and the like.

After application of the optionally modified pressure sensitive adhesive, the coated laminate is passed through third drying or curing zone 40 which utilizes conventional drying methods for pressure sensitive adhesive materials as discussed hereinabove, forming a final laminate having outer side release layer 34, and inner side pressure sensitive adhesive layer 42. Typically, temperatures in the range from about 190° to 280° F. for about 5 to 20 seconds are used. For pressure sensitive adhesives which are in a prepolymer form, a curing treatment is generally required. Such treatments are conventional in the art and may utilize heat and/or other means to effect curing.

Typically, pressure sensitive adhesive layer 42 has a composition which will be as described hereinafter and generally has a thickness in the range from about 0.1 to 7 mils, and preferably from about 0.3 to about 2 mils. Generally, it is coated in an amount, based on the dry solids weight, of from about 0.05 oz to about 3.0 oz per square yard, preferably from about 0.1 to about 1.0 oz per square yard and more preferably about 0.3 oz per square yard.

The overall thickness of the laminate is determined by the general end purpose for which it is to be used. Obviously, flexibility as well as weight would be factors which can be varied depending on this end purpose. Generally, however, where the present laminate is intended for application by the consumer for general protective and decorating purposes the overall laminate thickness is in the range from about 1 to 15 mils and preferably is from about 3.0 to 5.0 mils.

After forming the dried or cured laminate, pressure sensitive adhesive side 42 of the laminate is married to outer release layer side 34 by rolling the laminate upon itself, forming roll 44, which turns in the direction of arrow C.

Figure 4:
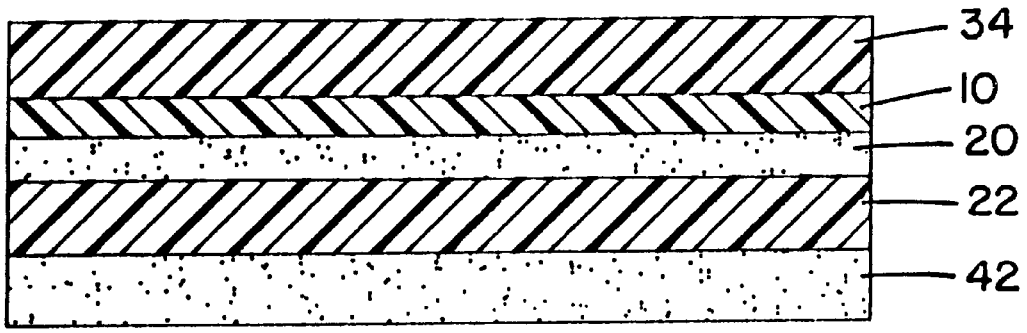
FIGS. 4, 5 and 6 are cross-sectional views illustrating laminates formed in accordance with the preferred embodiments of the present invention (the apparatus of FIG. 1 produces the laminate of FIG. 4).

The product made by the process of FIG. 1 is illustrated in FIG. 4 wherein the layers are set forth above.

Figure 2:
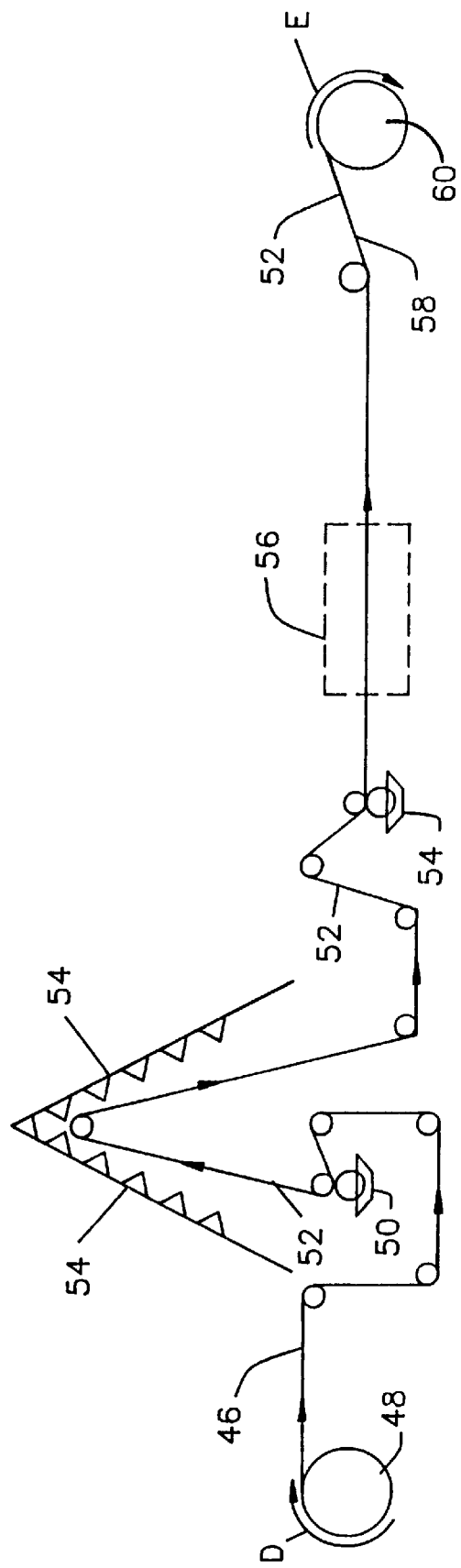
FIG. 2 is a drawing of another apparatus for producing a self-wound surface covering material as disclosed in the prior art.

Referring now to FIG. 2, this illustrates a method suggested by the prior art in which a laminate can be produced in roll form without the presence of a separate release sheet in the final roll and without a stabilizing layer or layers as required by the present invention. Thus, a self-wound self-adhesive roll of surface covering material is formed by first cast-coating the outer surface of vinyl substrate 46, from roll 48, which turns in the direction indicated by arrow D, with a release material in pan 50, the release material comprising a polyester, a polyurethane, or another material as more fully described hereinafter, to form a laminate with outer release layer 52 cast-coated on substrate 46. Subsequent to coating, the release coated vinyl substrate is then passed through a drying or curing zone 54 to cure or set outer release layer 52. Inner surface of substrate 46 is next coated with a modified pressure sensitive adhesive by passing through pan 54. The modification to the pressure sensitive adhesive involves incorporation of a polysiloxane, as discussed hereinabove. After application of the modified pressure sensitive adhesive material, the coated laminate is passed through second drying or curing zone 56 to dry the adhesive, forming a final laminate having outer release layer 52, and inner modified pressure sensitive adhesive layer 58. Thereafter, the pressure sensitive adhesive side 58 of the laminate is married to outer release layer side 52 by rolling the laminate upon itself, forming roll 60, which turns in the direction of arrow E. This prior art laminate is depicted in FIG. 3

Figure 3:
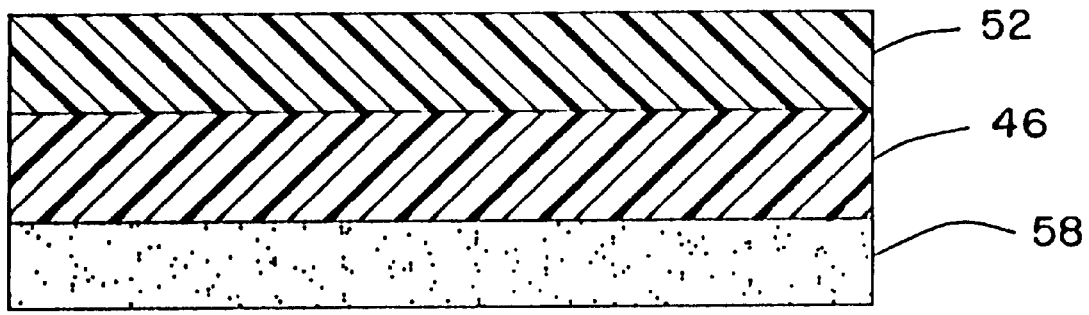
FIG. 3 is a cross-sectional view illustrating a laminate as prepared by the prior art.

A laminate as shown in FIG. 3 may be used as a self wound covering material in applications requiring narrow width tapes or perhaps borders. In wide width applications, however where the unrolling would be over a large surface line, a separate release sheet or backing layer should be used, in which the backing material is stripped away and discarded prior to application of the laminate.

Figure 5:
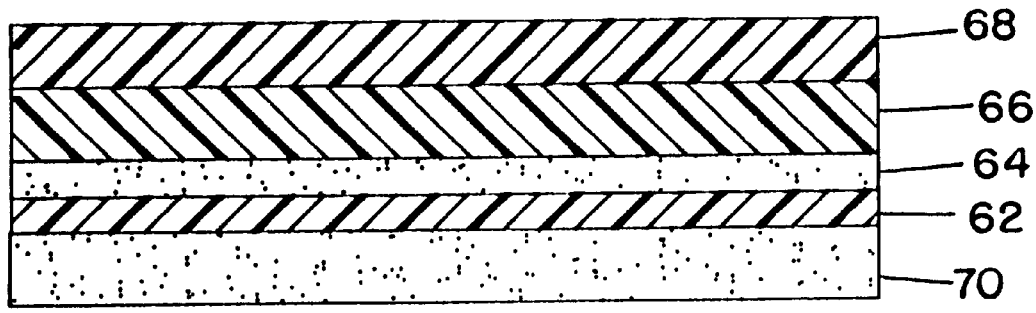

FIG. 5 depicts a second preferred embodiment in accordance with the present invention in which is shown polymeric film layer 62 comprising a continuous film of a polymer of the type used in FIG. 4 which under normal processing conditions remains dimensionally stable.

Unlike the embodiment depicted in FIG. 4, layer of pressure sensitive adhesive material 64 is coated on the outer surface (not the inner surface) of polymeric film layer 62. Substrate layer 66, which under normal processing conditions becomes dimensionally-unstable, as described hereinabove, is fixed to the outer (not the inner) surface of pressure sensitive adhesive layer 64 by marrying the pressure sensitive adhesive coated polymeric film to substrate layer 66. A dimensionally stable laminate is formed, which although unlike the embodiment in FIG. 4, possesses all of its advantages, except that it should not normally be printed. This dimensionally stable laminate however may be optionally decorated by having a pattern embossed, printed, or otherwise imposed upon the outer surface of substrate layer 66. Transparent flexible layer 68 comprising a synthetic resin material having release properties is deposited on top of optionally decorated top or outer surface of substrate layer 66. Layer of optionally modified pressure sensitive adhesive material 70 is coated on the inner surface of polymeric film layer 62 to complete this embodiment.

Figure 6:
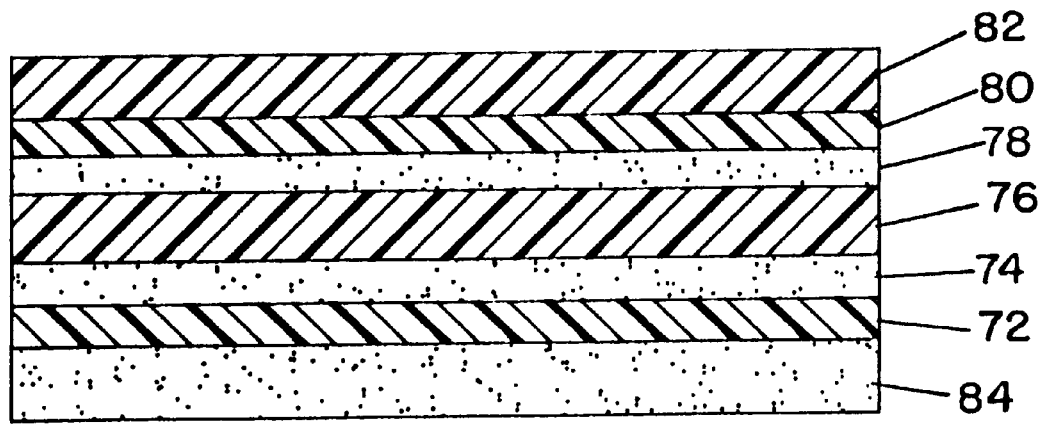

FIG. 6 depicts a third preferred embodiment of the present invention, by showing polymeric film layer 72 which comprises a continuous film dimensionally stable polymer, as discussed hereinabove. Layer of pressure sensitive adhesive material 74 is coated on the outer surface of polymeric film layer 72. Substrate layer 76, which is dimensionally-unstable, is fixed to the outer surface of pressure sensitive adhesive layer 74 by marrying the pressure sensitive adhesive coated polymeric film layer to substrate 76. The two layers 72 and 76 remain adhesively fixed by pressure sensitive adhesive layer 74, thereby forming a dimensionally stable laminate. This dimensionally stable laminate may be optionally decorated by having a decorative pattern embossed, printed, or otherwise imposed thereon, upon the top or outer surface of substrate layer 76. Layer of pressure sensitive adhesive material 78 is coated on the inner side of polymeric film layer 80, which remains dimensionally stable. The optionally decorated outer surface of substrate layer 76 is fixed to the inner side of pressure sensitive adhesive layer 78 by marrying the pressure sensitive adhesive coated polymeric film layer 80 to the substrate layer side of the dimensionally stable laminate (layers 72, 74 and 76). The two layers 76 and 80 remain adhesively fixed by pressure sensitive adhesive layer 78 forming a dimensionally stable laminate having an outer polymeric film layer 80, a middle optionally decorated substrate layer 76 and an inner polymeric film layer 72. This dimensionally stable laminate may be optionally decorated, as an alternative to decorating the top or outer surface of substrate layer 76, by having a decorative pattern embossed, printed, or otherwise imposed thereon, upon the outer surface of polymeric film layer 80. Transparent flexible layer 82 comprising a synthetic resin material having release properties, as discussed hereinabove, is coated on top of the optionally decorated outer surface of polymeric film layer 80. Layer of optionally modified pressure sensitive adhesive material 84 is coated on the inner surface of polymeric film layer 72 to form an overall laminate suitable for a self-wound roll of decorative covering material. Subsequent to the application of pressure sensitive adhesive layer 84, the laminate is subjected to a conventional drying or curing step. Following this, a self-wound self-adhesive roll of surface covering material will be produced by marrying transparent flexible layer 82 to pressure sensitive adhesive layer 84 by rolling the laminate upon itself.

Generally, in accordance with the present invention the substrate layer will comprise a continuous film of a polymer which under normal processing conditions, e.g., printing or embossing the surface, becomes dimensionally unstable and upon application of the surface covering to a substrate, absent a stabilizing layer, would exhibit shrinkage, edge curl or distortion of design indicia.

The present invention uses and is particularly well suited for laminates comprising a substrate layer which under normal processing conditions becomes dimensionally-unstable and typically will comprise a vinyl- or vinylidene halide homopolymer or copolymer, more preferably a poly (vinyl chloride) homopolymer. The substrate will generally be about 1.0 to 5.0 mils, preferably about 2.0 to 4.0 mils and more preferably about 2.5 or 3.0 mils. Additionally, the substrate layer may be a clear sheet or may be decorated by conventional means.

Specifically, by incorporating a continuous film of a polymer which under normal processing conditions remains dimensionally stable and adhesively fixing this stable layer to the surface of the substrate, thereby stabilizing the substrate for processing, the now formed dimensionally stable substrate may be further processed, e.g., decorating the outer facing layer, which will be either the substrate layer or the dimensionally stable polymeric layer depending on the chosen configuration, resulting in an overall laminate that is free of shrinkage, edge curl or distortion of printed indicia following application to a substrate to be covered.

The polymeric film, which under normal processing conditions remains dimensionally stable, will preferably comprise a polyolefin or a polyester, preferably where the polyolefin is polypropylene and the polyester is poly (ethylene terephthalate), and more preferably a polymeric film comprising a poly(ethylene terephthalate) having a thickness below about 4.0 mils, more preferably about 0.25 to 3.5, and most preferably about 0.5 mils.

The pressure sensitive adhesive materials conventionally used are either soluble or dispersible in water or organic solvents. Also, materials have been developed which are themselves liquids, or possess relatively high solids content, but nevertheless can be coated or applied without dilution or emulsification. Also known are materials known as the "hot melt" type which are rendered coatable by heating. However, the particular type of pressure sensitive material used is not critical so long as it fulfills its function as a pressure sensitive adhesive and does not adversely affect the other desirable properties of the laminate.

More specifically, the pressure sensitive adhesive material may be one from a well known class of adhesive materials generally available in the art, and contemplated by the present invention. Typically, such a conventional adhesive comprises a two component system, one component of which is a polymer or resin which is intrinsically tacky, such as, a tacky elastomer, or has intermixed therewith, a resin imparting tackiness and a second component which is a tack controlling component to reduce the tack of the adhesive layer to the desired peel bond value. The second component also imparts cutting properties to the adhesive layer so that it will cut when the transferrable film, i.e., the substrate layer is cut.

The second component is preferably a readily deformable material in order to allow the adhesive layer to make adequate contact with the receiving surface of the substrate which may be rough in texture. The tack controlling component is usually present in concentrations of from about 6 to 65 parts per 100 parts of the total tacky compound. Intrinsically tacky polymers include polyacrylic or methacrylic esters and acids; polyvinyl ethers; co-polymers of vinyl ethers and the aforesaid acrylic compounds; polyisobutylene and polybutenes; natural rubber; synthetic polyisoprene; polyvinylesters; polychloroprene; polybutadiene and co-polymers of butadiene with styrene.

Tackifying resins include hydrocarbon resins, terpene resins, such as, polybeta-pinene resin; resin derivatives, such as, hydrogenated resins and esters and liquid mixtures of polymeric styrene and homologues. Preferred materials are polyvinylbutylether; polyvinylethylether; polyvinylmethylether; polybutylacrylate or co-polymers of butylacrylate and methacrylate. Special mention is made of polyacrylates, and especially poly(n-butyl acrylate), poly(2-ethylhexyl acrylate), mixtures thereof, and the like).

A detailed description of such materials is set forth in U.S. Pat. No. 3,432,376, incorporated herein by reference.

A transparent flexible layer comprising a resin material having release properties is coated on top of the polymeric film layer. Typically, the transparent flexible layer has a matte or gloss finish and comprises a synthetic polymer or copolymer having a minimum film-forming temperature below about 20° C. Where a matte finish is desired, it may typically be achieved by the addition of an effective amount of a delustering or flatting agent such as calcium silicate, barium sulfate or natural and synthetic silicas, preferably a synthetic silica in an amount of about 10% to about 20% by weight, to reduce the gloss to a desired level.

In general most of the transparent flexible coatings may be obtained from emulsions or solutions of the following types: emulsion copolymers of vinylidene chloride and one or more acrylic esters, copolymers of styrene and one or more acrylic esters, plasticized polyvinyl acetate, vinyl acetate copolymers, acrylic ester polymers or copolymers and copolymers of butadiene with styrene, acrylonitrile or methyl methacrylate, solutions or dispersions of water soluble polyesters, water-dispersible polyurethanes, and the like. Suitable acrylic esters include the alkyl acrylates and methacrylates, such as methyl acrylate, ethyl acrylate, propyl acrylate, iso-propyl acrylate, butyl acrylate, t-butyl acrylate, hexyl acrylate, heptyl acrylate, 2-ethyl hexyl acrylate, decyl acrylate, dodecyl acrylate, methyl methacrylate, ethyl methacrylate, n-butyl methacrylate and the like. The vinylidene chloride/acrylic ester copolymers may contain up to 75 percent by weight of vinylidene chloride; thus copolymers of 60 to 75 percent by weight of vinylidene chloride and 25 to 40 percent by weight of ethyl acrylate and especially a copolymer of 70 percent vinylidene chloride and 30 percent ethyl acrylate in emulsion form are useful. Such vinylidene chloride copolymers have a minimum film-forming temperature greater than room temperature (i.e. greater than 20° C.) and exhibit a glass transition temperature of at least 25° C. Similarly emulsion copolymers of styrene and one or more acrylic esters, for example a copolymer containing 40 to 60 percent by weight of styrene and 40 to 60 percent by weight of butyl acrylate can also be used. A preferred copolymer emulsion is a copolymer of equal parts by weight of styrene and butyl acrylate. In such styrene/acrylic ester copolymers, the greater the styrene content the greater the proportion of long chain alkyl ester that is necessary in the acrylic ester component in order to provide the desirable value for the minimum film-forming temperature of greater than 20° C. As an example of another copolymer that may be used, mention is made of a copolymer of 60–40 percent by weight of methyl methacrylate and 40–60 percent by weight of ethyl acrylate. A release agent such as a wax or silicone emulsion, may be added to the polymer or copolymer emulsion, particularly when the minimum film-forming temperature of the polymer or copolymer is less than about 20° C. In an alternative procedure, the decorative surface may be given a first coating of one of the polymers or copolymers described above and then this first coating (after drying) may be given a lightweight coating of a release agent such as a wax or silicone emulsion. In addition there may be used for the coatings certain mixtures of synthetic emulsions with other materials such as are described in Parkinson et al's U.K. Pat. No. 1,157,040 which discloses a transparent coating composition for application to a base material of wallpaper to give a matt finish comprising a synthetic polymer, capable of giving a transparent flexible nonblocking film, in the form of an emulsion or latex, the polymer being present in an amount of the total dry weight content of between 45 and 95 percent, a polysaccharide which is only partially soluble in cold water in an amount of between 1 and 40 percent of the total dry weight content and a mineral filler in an amount of between 1 and 30 percent of the total dry weight content. A typical synthetic polymer emulsion for use in the transparent coating composition of U.K. Pat. No. 1,157,040 is a polyvinyl acetate emulsion at 55 percent solids content plasticized to give 10 percent of plasticizer on polymer weight the plasticizer being di-isobutyl phthalate. Also useful, and preferred, are water-dispersible resins of the type described in German Published Patent Application Nos. 2141805 and 2141807 and U.S. Pat. Nos. 3,905,929 and 5,043,381.

A preferred transparent flexible layer, comprising a polyurethane or polyester cast- or transfer-coated from an aqueous medium is at a weight of from about 0.2 lbs to about 5.0 lbs per 3000 square feet, preferably 0.5 lbs to about 2.0 lbs per 3000 square feet and more preferably 1.5 lbs per 3000 square feet, including an effective amount of a release agent comprising a silicone, a natural wax, a synthetic wax, or a mixture of any of the foregoing, and an optional delustering or flatting agent to give a matte finish, as described hereinabove.

The preferred modified pressure sensitive adhesive layer of the laminate of the present invention possesses means for decreasing the "zero minute peel value" (as defined hereinafter) of the facing layer-pressure sensitive adhesive layer combination composed of a polysiloxane, formed from monomeric units having structures (I) and (II), or an admixture of polysiloxanes (A) and (B), intimately mixed with the pressure sensitive adhesive prior to the adhesive layer being coated.

A layer of the preferred modified pressure sensitive adhesive material is coated on the inner surface of the laminate. Upon drying or curing, such as by conventional methods used for such pressure sensitive adhesive materials as discussed hereinabove, a laminate suitable for a self-wound self-adhesive roll of surface covering material is formed having an outer transparent flexible release layer.

As stated hereinabove, the pressure sensitive adhesive material may be modified by incorporation of a polysiloxane, formed from monomeric units having structures (I) and (II), or an admixture of polysiloxanes (A) and (B) and wherein the coating of the modified pressure sensitive adhesive layer may be accomplished by conventional methods, e.g., knife-coating, spraying, roller coating, gravure roll, and the like. Regardless of the particular coating method, the pressure sensitive adhesive coating on the inner surface of the final laminate, on a dry weight basis, will generally be about 0.05 oz to 5.0 oz per square yard, preferably about 0.1 oz to 1.5 oz per square yard and more preferably 0.6 oz per square yard.

The optionally modified pressure sensitive adhesive layer may be one from a well known class of adhesive materials generally available in the art, as discussed hereinabove with regard to the pressure sensitive adhesive layer, and may be modified in the manner which will be described in greater detail hereinafter. A detailed description of such modified materials is set forth in commonly owned pending application of Smith, U.S. Ser. No. 08/043,388, filed Apr. 6, 1993.

The preferred polysiloxane admixtures used to make the laminates of the present invention may be mixed or dispersed into the pressure sensitive adhesive using a variety of techniques well known and conventional in the art. Thus, for example, the polysiloxane whether it is used as is, or diluted either in a solvent or an aqueous emulsion may be blended into the pressure sensitive adhesive after manufacture of the adhesive, but prior to packaging; or at the plant where the adhesive is to be used, either by mixing the polysiloxane admixture into batches of adhesive or metering and dispersing the polysiloxane or admixture into the adhesive immediately prior to the coating step during fabrication of the laminate. It is thus within the skill of the art to use any of these methods to introduce the polysiloxane material and to regulate the parameters affecting the distribution, e.g., mixing speed, configuration of mixing blades, duration of mixing, etc., so as to produce a uniform dispersion.

It has been found, generally, that a concentration of the admixed polysiloxanes of from about 0.001 to 20% by weight, and most preferably from about 0.1 to 1.0% by weight, based on the solids content of the pressure sensitive adhesive will lead to a product having properties within an optimal range.

In any event, the specific amount of polysiloxane admixture and the specific manner of its dispersion should be regulated so as to produce a substantial decrease in the zero minute peel value of the product as compared to a control laminate and to provide for a twenty minute peel value of at least about 75 grams per inch. Preferably, the reduction in the zero minute peel value as compared to the zero minute peel value of the control laminate is in the range of at least greater than about 25%. It is possible of course, that for a specific purpose, the skilled artisan might desire to decrease the percent reduction in the zero minute peel as compared to the control laminate. For example, in wide with applications, e.g., 21 ½ inches for typical decorative wall coverings or 48 inches for typical wall board or paneling sizes, the zero minute peel value will generally be decreased to below about 50 grams per inch and for narrow width applications, e.g., tapes or borders, the zero minute peel value may be greater, exceeding about 100 grams per inch.

After unrolling the laminate, it may be applied to the desired substrate, e.g., furniture, walls, cabinet surfaces, etc. In preferred embodiments unique properties of laminate are bestowed on it by the modification of the pressure sensitive adhesive, and it is possible to easily position modified adhesive layer onto the substrate, to easily remove it and to reposition it if necessary. Moreover, if portions of the pressure sensitive adhesive side of such laminate should touch one another, they are easily pulled apart without disturbing the uniformity of the pressure sensitive adhesive layer. Consequently, the usual tangles, wrinkles, creases, stretches, etc., frequently encountered with pressure sensitive coated material of this type are avoided.

Although the prior art discloses a self-wound covering material comprising a modified pressure sensitive adhesive layer and a substrate layer, which is provided with release properties through conventional methods as more fully described hereinabove, this self wound covering material is only useful in applications requiring narrow width tapes or perhaps borders, since a high zero peel strength value will make it difficult if not impossible to unroll wide widths without damage and a lower zero peel value will lead to distortions following application to a substrate.

From the above it can be seen that the laminate of the present invention possesses a number of advantageous properties as compared to the majority of laminates generally used for the same type of purpose which have been previously known.

Thus, generally, the present laminate, upon being initially unrolled in a wide width form and positioned onto the desired substrate, for example, a wall, can be easily removed without any adverse affects should it be desired to reposition the laminate. This might occur, for example, in the case where the laminate, in its initial application to the substrate, was not straight, or possessed wrinkles, or bubbles. In such a case, the laminate may be easily removed by the applier without stretching the laminate or difficulty in pulling it from the substrate.

Additionally, once the laminate has been applied to the satisfaction of the applier, it possesses sufficient adhesion to the substrate, so as to remain in the position applied. Also, over a period of time, for example, 20 minutes to an hour, the adhesion, or peel value as it is hereinafter defined, increases to a sufficiently high value to produce a stable decorated substrate, yet removable. For example, a wide width surface covering of the current invention applied to wall board will typically achieve an adhesion or peel value of about 75 to 1000 grams per inch, preferably about 100 grams per inch.

It is difficult to quantify the ease or difficulty with which the laminate can be initially applied without damage to the laminate or after such initial application, removed from the substrate. Thus, the ease of application of the laminate depends on the skill of the person applying the laminate as well as the nature of the particular substrate to which it is being applied. Many types of substrates, for example, walls, composed of painted wall board, painted cinder block or plastic, etc., will be encountered by the typical user of this laminate, i.e., the consumer. As a result, depending on the particular nature of the end use, the ease of application and specific properties with respect to degree of adherence encountered with each of the different types of substrates will vary in an undeterminable manner.

Unquestionably, however, the person using the present laminate will encounter substantially less difficulty in unrolling and applying the laminate, with less chance of damaging the laminate, i.e., through stretching, of the present invention as compared to use of the majority of prior art laminates, i.e., a laminate without the outer release layer, the specific modification to the pressure sensitive adhesive or the dimensional stability contemplated by the present invention.

Overall, in accordance with the present invention, the laminate may be unrolled and applied to the desired substrate, e.g., furniture, walls, cabinet surfaces, etc. By virtue of the unique properties of laminate bestowed on it by the dimensionally stable layer, the laminate may be unrolled, in wide widths or over long contact lines, e.g. 5 ft wide rolls, without delamination or damage to the printed facing layer or the protective outer release layer. Additionally, the pressure sensitive adhesive layer remains in tact, with essentially none of the adhesive remaining affixed to the outer release surface upon unrolling the wide width laminate.

Also, because of the dimensionally stable layer, the flexible outer release layer and the modified pressure sensitive adhesive as described hereinabove, it is possible to easily position the present laminate onto the substrate, to easily remove it and to reposition it if necessary. Moreover, if portions of the modified pressure sensitive adhesive side of laminate should touch one another, they are easily pulled apart without disturbing the uniformity of the pressure sensitive adhesive layer. Consequently, the usual tangles, wrinkles, creases, stretches, etc., frequently encountered with pressure sensitive coated material of this type are avoided.

From the above it can be seen that the laminate of the present invention possesses a number of advantageous properties as compared to the majority of laminates generally used for the same type of purpose which have been previously known. The disadvantages of such prior laminates have been outlined hereinabove. More particularly, by virtue of the nature of the outer release layer, the modified pressure sensitive adhesive and the dimensionally stable layer used in the laminate of the present invention, the present laminate, over all, is substantially easier to handle with respect to its unrolling and application to a substrate, without damage to the laminate, and maintains its condition following application to a substrate than most prior known laminates and this is especially apparent for wide width applications.

DESCRIPTION OF PREFERRED EMBODIMENTS

The following examples illustrate the present invention:

EXAMPLE 1

A self-wound roll of decorative covering is made using a poly(ethylene terephthalate) film having a thickness of about 0.5 mils as a dimensionally stable polymeric layer. Using an apparatus as generally shown in FIG. 1, but including printing stages, one side is coated with a pressure sensitive adhesive comprising a butyl acrylate homopolymeric pressure sensitive adhesive having a solids content of about 50% by weight, a viscosity of about 480 cps. (#3 spindle at 60 rpm) and a plasticity of about 1.8 mm. Thereafter the pressure sensitive adhesive coated side is married to a 2.5 mil thick film of polyvinyl chloride substrate, forming a dimensionally stable laminate. The poly(ethylene terephthalate) film is then decorated by printing with a water-dispersed ink in several stages with heating and drying between stages and after the final printing stage. The poly(ethylene terephthalate) side of the laminate is next cast-coated with a controlled release layer by depositing an aqueous solution of a heat curable polyurethane to a thickness of about 0.25–0.5 milli-inches (dry basis) and dried and cured at 100° C. This layer is elastomeric, having a elongation to break of 400%, and a tensile strength of 4,000 psi. The polyurethane solution from which the coating is prepared can be obtained in ways well known to those skilled in this art, e.g., by reacting a trifunctional isocyanate prepolymer with a monofunctional polyethylene oxide ether to produce a difunctional product which is dispersed in water and reacted with a difunctional chain extender, for example a diamine, to form a polyurethane of nonionic, but water-dispersible characteristics. See, for example, the patents mentioned above. Opposite the polyurethane coating is applied a layer of zero peel strength modified acrylic pressure sensitive adhesive containing a mixture of silicones made as follows:

A dimethylsiloxane homopolymer having a viscosity of about 1,000 to 3,000 cps. (#4 spindle at 30 rpm) is mixed at a 1 to 1 weight ratio with a dimethylsiloxane-oxyalkylene block copolymer containing oxyethylene and oxypropylene units and having a viscosity of about 2,250 cps. (#4 spindle at 30 rpm) to produce an admixture which is suspended in water with a propeller type stirrer to form a composition having a ratio of polysiloxane admixture to water of about 1 to 3, respectively, by weight. This solution is slowly added to a butyl acrylate homopolymeric pressure sensitive adhesive having a solids content of about 50% by weight, a viscosity of about 480 cps. (#3 spindle at 60 rpm) and a plasticity of about 1.8 mm contained in a suitable vessel fitted with a double blade mixer. The concentration of polysiloxane admixture in the pressure sensitive adhesive is 0.2% by weight based on the solids content of the adhesive. The contents of the vessel are then mixed by the double blade mixer at 60–65 rpm for 16 hours. Application is made to provide a dry coating weight of 0.6 oz per square yard.

The decorative surface covering made by this example is rolled upon itself with the pressure sensitive adhesive side facing inward to the roll. After storage at 158° F. for 7 days it can be unwound without delamination and applied repositionably and removably to an acrylic painted wallboard surface and no distortion, shrinkage, edge curl or edge lifting will be observed after many months of service.

COMPARATIVE EXAMPLE 1A*

For comparative purposes Example 1 procedure is exactly repeated but this time omitting the 1 mil poly(ethylene terephthalate) stabilizing polymer film. A self-wound laminate is produced. After storage for 7 days at 158° F. it cannot be unwound without damage to the decorative surface and after application to acrylic painted wallboard and allowing to stand for 7 days at 158° F., distortion occurs with edge lifting, severe shrinkage, distortion of the printed indicia and the like.

EXAMPLE 2

The procedure of Example 1 is followed except that instead of cast-coating the poly(ethylene terephthalate) side of the laminate, formed by marrying a 2.5 mil thick substrate of polyvinyl chloride to the pressure sensitive adhesive coated side of the 0.5 mil poly(ethylene terephthalate) film, with a controlled release layer, the side opposite the poly (ethylene terephthalate) film is cast-coated with a controlled release layer. Thereafter, opposite the controlled release layer is applied a layer of an acrylic pressure sensitive adhesive as in Example 1.

As in Example 1, the now formed decorative covering made by this example is rolled upon itself with the pressure sensitive adhesive side facing inward to the roll. Again, after storage for 7 days at 158° F. it can be unwound without damage and applied repositionably and removably to an acrylic painted wallboard surface and no shrinkage, edge curl, edge lifting or distortion of the decorative indicia will be observed after 7 days at 158° F.

EXAMPLE 3

The procedure of Example 1 is followed except that after forming a laminate by marrying a 2.5 mil thick substrate of polyvinyl chloride to the pressure sensitive adhesive coated side of a first 0.5 mil poly(ethylene terephthalate) film, a second 0.5 mil poly(ethylene terephthalate) film is coated with a second pressure sensitive adhesive. Thereafter, the second pressure sensitive adhesive coated side of the second poly(ethylene terephthalate) film is married to the polyvinyl chloride substrate opposite the first poly(ethylene terephthalate) film. One of the poly(ethylene terephthalate) sides of the laminate is next cast-coated with a controlled release layer. Thereafter, opposite the controlled release layer is applied a layer of an acrylic pressure sensitive adhesive as in Example 1.

Again, the now formed decorative covering made by this example is rolled upon itself with the pressure sensitive adhesive side facing inward to the roll. Also, after storage for 7 days at 158° F. it can be unwound without damage and applied repositionably and removably to an acrylic painted wallboard surface without shrinkage, edge lifting, distortion of the decorative indicia or the like being apparent after 7 days at 158° F. of service.

The above mentioned patents and applications are incorporated herein by reference.

The present invention possesses a number of advantageous properties as compared to the majority of laminates generally used for the same type of purpose which have been previously known. The disadvantages of such prior laminates have been outlined hereinabove. More particularly, by virtue of the nature of the outer release layer, the pressure sensitive adhesive and the dimensionally stable layer used in the laminate of the present invention, the present laminate, over all, is substantially easier to handle with respect to its unrolling and application to a substrate, without damage to the laminate, and furthermore the laminate is free of shrinkage, edge curl or distortion of printed indicia following application to a substrate, even in wide width applications, and can be stripped without damage to the substrate even after many months.

Many variations of the present invention will suggest themselves to those skilled in this art in light of the above, detailed description. For example, instead of a silicone release composition, release properties can be achieved with natural and/or synthetic waxes. The outer release layer can comprise a copolymer of styrene and butyl acrylate in admixture with a silicone material, the substrate layer may comprise poly(vinylidene chloride), and the dimensionally stable layer may comprise polypropylene. The layer below the controlled release surface may be optionally decorated by printing, embossing or incorporating a solid colored pigmented layer. A matte finished layer can be provided if about 10 to 20 wt % of fumed collodial silica (solids basis) having a particle size in the range of about 1 to 3 microns is included in the coating composition. Instead of a pressure sensitive adhesive modified with the particular silicones specified to yield low zero peel strength, a conventional pressure sensitive adhesive having "normal" zero peel strength can be used. In all cases, however, the variations must provide that a dimensionally stable layer is fixed to the substrate layer on at least one side prior to further processing so that stretching and distortion of any decoration may be controlled. All such obvious variations are within the full intended scope of the appended claims.

What I claim and desire to secure by Letters Patent is:

1. A self-wound roll of pressure sensitive adhesive surface covering comprising:

(a) a laminate having two surfaces, said laminate consisting essentially of:
 (i) a substrate layer having a first surface and a second surface, said substrate layer comprising a polymeric film comprising a vinyl- or vinylidene halide homopolymer or copolymer;
 (ii) a first stabilizing layer adhered to said first surface of said substrate layer, said first stabilizing layer comprising a polymeric film comprising a polyolefin or a polyester; and
 (iii) an optional second stabilizing layer adhered to said second surface of said substrate layer, said stabilizing layer comprising a polymeric film comprising a polyolefin or a polyester;

(b) a pressure sensitive adhesive layer on one surface of said laminate; and (c) a release layer on the other surface of said laminate, said release layer consisting of a transparent flexible synthetic resin material having release properties with respect to said pressure sensitive adhesive layer;

wherein said self-wound roll includes a plurality of turns of said pressure sensitive adhesive surface covering such that said release layer (c) on one turn is in contact with said pressure sensitive adhesive layer (b) on an adjacent turn, said release layer after storage for 7 days at 158° C. (c) being readily separable from said pressure sensitive adhesive layer (b).

2. The self-wound roll of pressure sensitive adhesive surface covering of claim 1 wherein said optional second stabilizing layer (a)(iii) is not present and said pressure sensitive adhesive layer (b) is on said second surface of said substrate layer (a)(i).

3. The self-wound roll of pressure sensitive adhesive surface covering of claim 1 wherein said substrate layer (a)(i) is decorated.

4. The self-wound roll of pressure sensitive adhesive surface covering of claim 1 wherein said first stabilizing layer (a)(ii) is decorated.

5. The self-wound roll of pressure sensitive adhesive surface covering of claim 1 wherein said substrate layer (a)(i) comprises a poly(vinyl chloride) homopolymer.

6. The self-wound roll of pressure sensitive adhesive surface covering of claim 1 wherein said polyolefin is polypropylene.

7. The self-wound roll of pressure sensitive adhesive surface covering of claim 1 wherein said polyester is poly(ethylene terephthalate).

* * * * *